United States Patent
Huang

(10) Patent No.: US 12,056,861 B2
(45) Date of Patent: Aug. 6, 2024

(54) SIGNAL PROCESSING CIRCUIT AND SIGNAL PROCESSING METHOD

(71) Applicant: Realtek Semiconductor Corp., HsinChu (TW)

(72) Inventor: Yu-Shiang Huang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 423 days.

(21) Appl. No.: 17/555,496

(22) Filed: Dec. 19, 2021

(65) Prior Publication Data

US 2022/0237752 A1  Jul. 28, 2022

(30) Foreign Application Priority Data

Jan. 26, 2021 (TW) ................. 110102785

(51) Int. Cl.
*G06T 5/90* (2024.01)
*G06T 5/77* (2024.01)

(52) U.S. Cl.
CPC .................. *G06T 5/90* (2024.01); *G06T 5/77* (2024.01); *G06T 2207/20172* (2013.01)

(58) Field of Classification Search
CPC .... G06T 5/90; G06T 5/77; G06T 2207/20172
See application file for complete search history.

(56) References Cited

U.S. PATENT DOCUMENTS

| | | | |
|---|---|---|---|
| 11,922,608 B2* | 3/2024 | Huang | ............. G06T 5/73 |
| 2007/0273686 A1* | 11/2007 | Watanabe | ............. G06T 15/506 |
| | | | 345/419 |
| 2020/0143512 A1 | 5/2020 | Huang | |

* cited by examiner

*Primary Examiner* — Aaron W Carter
*Assistant Examiner* — Courtney Joan Nelson
(74) *Attorney, Agent, or Firm* — Winston Hsu

(57) ABSTRACT

The present invention provides an image processing circuit and associated image processing method. In the image processing circuit, a characteristic value calculation circuit is designed to calculate the plurality of characteristic values of consecutive-three-pixels with increasing/decreasing brightness, the plurality of left-side characteristic values of consecutive-three-pixels with increasing/decreasing brightness and the plurality of right-side characteristic values of consecutive-three-pixels with increasing/decreasing brightness, for the brightness adjustments. The adjusted brightness values of the present invention have sharper edges to improve the image quality.

12 Claims, 4 Drawing Sheets

SIGNAL PROCESSING CIRCUIT AND SIGNAL PROCESSING METHOD

BACKGROUND OF THE INVENTION

1. Field of the Invention

The present invention relates to image processing, and more particularly, to an image processing method which can improve the image sharpness.

2. Description of the Prior Art

In a conventional image enlargement technique, a spline method is used to calculate pixel values of the enlarged image. However, this method causes an irregular shape of the oblique edges in the image, and if other image enlargement techniques are to be used to alleviate this phenomenon, a large amount of computation is usually required to increase the software operation time or the hardware manufacturing cost. In addition, when the enlargement factor (i.e. enlargement ratio) is large, the enlarged image has a fuzzy edge transition at the edge, so that a large amount of calculation is required to improve this issue.

In addition, if the image has a wider edge transition, that is, the image content contains multiple pixels with continuous increasing/decreasing brightness, it will also affect the quality of subsequent image enlargement or other image processing.

SUMMARY OF THE INVENTION

It is therefore an objective of the present invention to provide an image processing method, which can process a plurality of pixels with continuous increasing/decreasing brightness while using a relatively low amount of calculation to facilitate related image processing operations.

According to one embodiment of the present invention, an image processing circuit comprising a receiving circuit, a characteristic value calculation circuit, a brightness difference adjustment circuit and an output circuit is disclosed. The receiving circuit is configured to receive image data. The characteristic value calculation circuit is coupled to the receiving circuit, wherein for a plurality of consecutive pixels in the image data, the characteristic value calculation circuit calculates a plurality of characteristic values of consecutive-three-pixels with increasing brightness according to a brightness difference of any two adjacent pixels of the plurality of pixels, and the characteristic value calculation circuit further calculates a plurality of left-side characteristic values of consecutive-three-pixels with increasing brightness and a plurality of right-side characteristic values of consecutive-three-pixels with increasing brightness according to the plurality of characteristic values of consecutive-three-pixels with increasing brightness. The brightness difference adjustment circuit is coupled to the characteristic value calculation circuit, and is configured to calculate a plurality of adjusted brightness differences according to the brightness difference of any two adjacent pixels of the plurality of pixels, the plurality of left-side characteristic values of consecutive-three-pixels with increasing brightness and the plurality of right-side characteristic values of consecutive-three-pixels with increasing brightness. The output circuit is coupled to the brightness difference adjustment circuit, and is configured to generate a plurality of adjusted brightness values according to brightness values of the plurality of pixels and the plurality of adjusted brightness differences.

According to one embodiment of the present invention, an image processing method comprises the step of: receiving image data; for a plurality of consecutive pixels in the image data, calculating a plurality of characteristic values of consecutive-three-pixels with increasing brightness according to a brightness difference of any two adjacent pixels of the plurality of pixels, and calculating a plurality of left-side characteristic values of consecutive-three-pixels with increasing brightness and a plurality of right-side characteristic values of consecutive-three-pixels with increasing brightness according to the plurality of characteristic values of consecutive-three-pixels with increasing brightness; and calculating a plurality of adjusted brightness differences according to the brightness difference of any two adjacent pixels of the plurality of pixels, the plurality of left-side characteristic values of consecutive-three-pixels with increasing brightness and the plurality of right-side characteristic values of consecutive-three-pixels with increasing brightness; and generating a plurality of adjusted brightness values according to brightness values of the plurality of pixels and the plurality of adjusted brightness differences.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
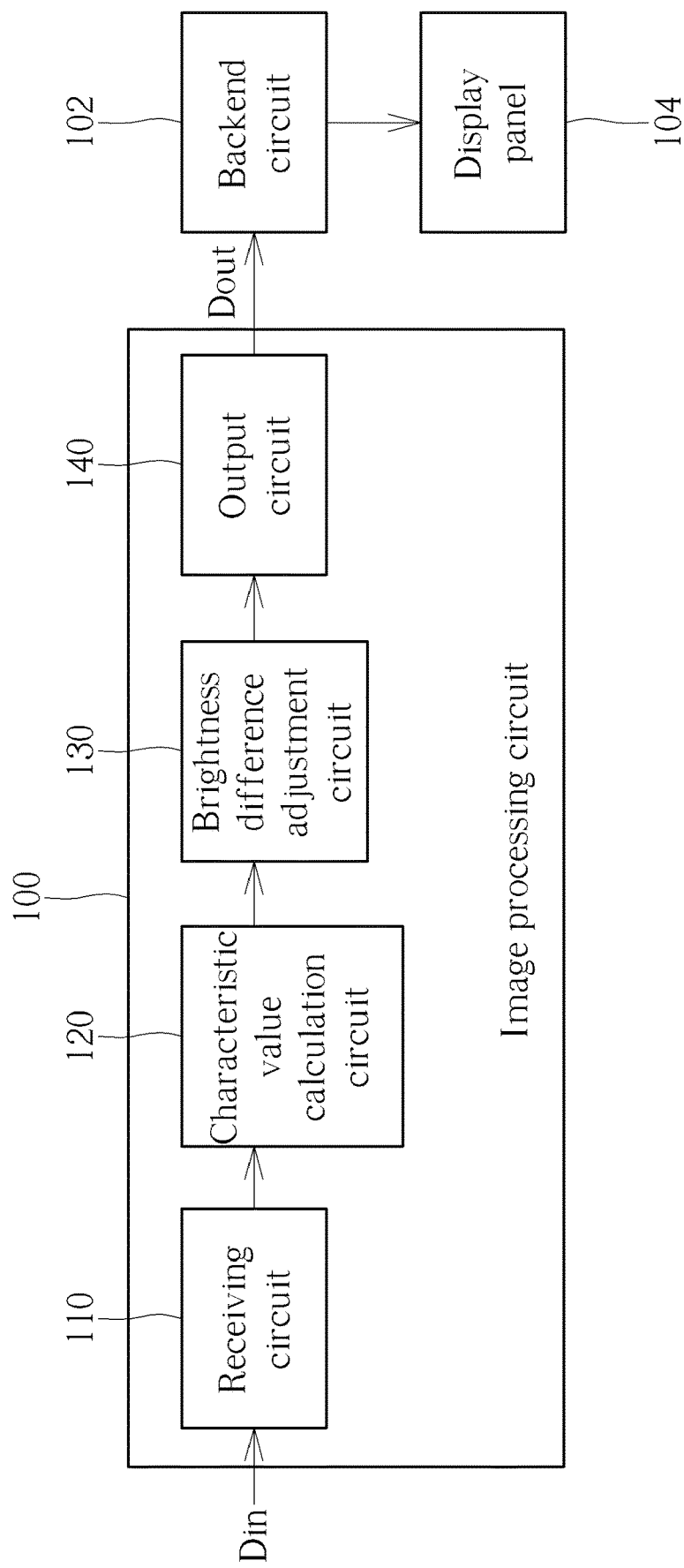
FIG. 1 is a diagram illustrating an image processing circuit according to one embodiment of the present invention.

FIG. 1 is a diagram illustrating an image processing circuit 100 according to one embodiment of the present invention. As shown in FIG. 1, the image processing circuit 100 comprises a receiving circuit 110, a characteristic value calculation circuit 120, a brightness difference adjustment circuit 130 and an output circuit 140. In this embodiment, the image processing circuit 100 is configured to receive image data Din (e.g., image frame) and process the image data Din to generate an output image Dout, and the output image Dout is processed by a backend processing circuit 102 and then transmitted to a display panel 104 to be displayed thereon.

In the operation of the image processing circuit, the receiving circuit 110 receives the image data Din, the characteristic value calculation circuit 120 calculates the corresponding characteristic values for the consecutive pixels with increasing/decreasing brightness in the image data Din, wherein the characteristic values comprise characteristic values of consecutive-two-pixels with increasing/decreasing brightness, characteristic values of consecutive-three-pixels with increasing/decreasing brightness, and characteristic values of consecutive-four-pixels with increasing/decreasing brightness. Then, the brightness difference adjustment circuit 130 adjusts the brightness difference between some pixels in the image data Din according to the aforementioned characteristic values. Finally, the output circuit 140 generates the output image Dout according to the adjusted brightness difference.

In the following descriptions, it is assumed that the image data Din comprises consecutive N pixels in the same column or the same row of a frame. For convenience of explanation, the following contents are described by using nine consecutive pixels. Assuming that the pixels corresponding to positions 0, 1, 2, 3, 4, 5, 6, 7 and 8 of the image data Din have the pixel values "0", "0", "2", "5", "8", "11", "14", "16" and "16", respectively, wherein in the following description, a brightness value serves as the pixel value.

Next, regarding the operations of the characteristic value calculation circuit 120, the brightness difference adjustment circuit 130 and the output circuit 140, please refer to the following table 1 together.

TABLE 1

| Position | 0 | 1 | 2 | 3 | 4 | 5 | 6 | 7 | 8 |
|---|---|---|---|---|---|---|---|---|---|
| Original brightness | 0 | 0 | 2 | 5 | 8 | 11 | 14 | 16 | 16 |
| Brightness difference | | 0 | 2 | 3 | 3 | 3 | 3 | 2 | 0 |
| Characteristic value of consecutive two points with increasing brightness | | 0 | 2 | 3 | 3 | 3 | 2 | 0 | |
| Characteristic value of consecutive three points with increasing brightness | | | 0 | 2 | 3 | 3 | 2 | 0 | |
| Characteristic value of consecutive four points with increasing brightness | | | 0 | 2 | 3 | 2 | 0 | | |
| Left-side characteristic value of consecutive three point with increasing brightness | | | 0 | 2 | 1 | 0 | 0 | 0 | |
| Right-side characteristic value of consecutive three point with increasing brightness | | | 0 | 0 | 0 | 1 | 2 | 0 | |
| Adjusted brightness difference | | 0 | 0 | 4 | 4 | 4 | 4 | 0 | 0 |
| Adjusted brightness | 0 | 0 | 0 | 4 | 8 | 12 | 16 | 16 | 16 |

In the operation of the characteristic value calculation circuit 120, first, the brightness difference between two pixels is calculated, that is, the values (0, 2, 3, 3, 3, 3, 2, 0) shown in table 1. Then, the characteristic value calculation circuit 120 calculates the characteristic value of the consecutive-two-pixels with increasing brightness according to a same-sign component of two brightness differences, wherein the same-sign component of two brightness differences can be a median of three values comprising the two brightness differences and zero. Taking the position 2 of the table 1 as an example, the adjacent two bright differences are "2" and "3", so the characteristic value of the consecutive-two-pixels with increasing brightness is the median "2" of the values (0, 2, 3); in addition, taking the position 3 of the table 1 as an example, the adjacent two bright differences are "3" and "3", so the characteristic value of the consecutive-two-pixels with increasing brightness is the median "3" of the values (0, 3, 3). Then, the characteristic value calculation circuit 120 calculates the characteristic value of the consecutive-three-pixels with increasing brightness according to a same-sign component of two characteristic values of the consecutive-two-pixels with increasing brightness, wherein the same-sign component of two characteristic values of the consecutive-two-pixels with increasing brightness can be a median of three values comprising the two characteristic values of the consecutive-two-pixels with increasing brightness and zero. Taking the positions 2 and 3 of the table 1 as an example, the characteristic values of the consecutive-two-pixels with increasing brightness are "2" and "3", so the characteristic value of the consecutive-three-pixels with increasing brightness between the positions 2 and 3 is the median "2" of the values (0, 2, 3); and taking the positions 3 and 4 of the table 1 as an example, the characteristic values of the consecutive-two-pixels with increasing brightness are "3" and "3", so the characteristic value of the consecutive-three-pixels with increasing brightness between the positions 3 and 4 is the median "3" of the values (0, 3, 3). Then, the characteristic value calculation circuit 120 calculates the characteristic value of the consecutive-four-pixels with increasing brightness according to a same-sign component of two characteristic values of the consecutive-three-pixels with increasing brightness, wherein the same-sign component of two characteristic values of the consecutive-three-pixels with increasing brightness can be a median of three values comprising the two characteristic values of the consecutive-three-pixels with increasing brightness and zero. Taking the position 2 of the table 1 as an example, the adjacent characteristic values of the consecutive-three-pixels with increasing brightness are "0" and "2", so the characteristic value of the consecutive-four-pixels with increasing brightness of the position 2 is the median "0" of the values (0, 0, 2); and taking the position 3 of the table 1 as an example, the adjacent characteristic values of the consecutive-three-pixels with increasing brightness are "2" and "3", so the characteristic value of the consecutive-four-pixels with increasing brightness of the position 3 is the median "2" of the values (0, 2, 3).

After the characteristic values of the consecutive-two-pixels with increasing brightness, the characteristic values of the consecutive-three-pixels with increasing brightness, and the characteristic values of the consecutive-four-pixels with increasing brightness are calculated, the characteristic value calculation circuit 120 further calculates left-side characteristic values of consecutive-three-pixels with increasing brightness and right-side characteristic values of consecutive-three-pixels with increasing brightness according to the characteristic values of the consecutive-three-pixels with increasing brightness and the characteristic values of the consecutive-four-pixels with increasing brightness. Specifically, the characteristic value calculation circuit 120 subtracts a left-side characteristic value of the consecutive-four-pixels with increasing brightness from the characteristic value of the consecutive-three-pixels with increasing brightness to obtain the left-side characteristic value of consecutive-three-pixels with increasing brightness. Taking the characteristic value of the consecutive-three-pixels with increasing brightness "2" between the positions 2 and 3 as example, the left-side characteristic value of consecutive-three-pixels with increasing brightness is "2" (i.e., 2−0=0); and taking the characteristic value of the consecutive-three-pixels with increasing brightness "3" between the positions 3 and 4 as example, the left-side characteristic value of consecutive-three-pixels with increasing brightness is "1" (i.e., 3−2=1). In addition, the characteristic value calculation circuit 120 subtracts a right-side characteristic value of the consecutive-four-pixels with increasing brightness from the characteristic value of the consecutive-three-pixels with increasing brightness to obtain the right-side characteristic value of consecutive-three-pixels with increasing brightness. Taking the characteristic value of the consecutive-three-pixels with increasing brightness "3" between the positions 3 and 4 as example, the right-side characteristic value of consecutive-three-pixels with increasing brightness is "0" (i.e., 3−3=0); and taking the characteristic value of the consecutive-three-pixels with increasing brightness "3" between the positions 4 and 5 as example, the right-side characteristic value of consecutive-three-pixels with increasing brightness is "1" (i.e., 3−2=1).

Then, the brightness difference adjustment circuit 130 calculates the adjusted brightness difference based on the left-side characteristic values of consecutive-three-pixels with increasing brightness and the right-side characteristic values of consecutive-three-pixels with increasing brightness. Specifically, for each brightness difference, the brightness difference adjustment circuit 130 increases the brightness difference by adding the left-side characteristic values of consecutive-three-pixels with increasing brightness and the right-side characteristic values of consecutive-three-pixels with increasing brightness, and the brightness difference adjustment circuit 130 further subtracts the left-side characteristic values of consecutive-three-pixels with increasing brightness from the left-side brightness difference, and subtracts the right-side characteristic values of consecutive-three-pixels with increasing brightness from the right-side brightness difference. In other words, the calculation method of the brightness difference adjustment circuit 130 can be regarded as moving the brightness difference inward, and the content of Table 1 is used as an illustration: move the brightness difference "2" between the positions 1 and 2 to the pixels of the positions 2 and 3 according to the left-side characteristic values of consecutive-three-pixels with increasing brightness "2" between the pixels of the positions 2 and 3; move the brightness difference "1" between the positions 2 and 3 to the pixels of the positions 3 and according to the left-side characteristic values of consecutive-three-pixels with increasing brightness "1" between the pixels of the positions 3 and 4; move the brightness difference "2" between the positions 6 and 7 to the pixels of the positions 5 and according to the right-side characteristic values of consecutive-three-pixels with increasing brightness "2" between the pixels of the positions 5 and 6; and move the brightness difference "1" between the positions 5 and 6 to the pixels of the positions 4 and 5 according to the right-side characteristic values of consecutive-three-pixels with increasing brightness "1" between the pixels of the positions 4 and 5. According to the above calculation results, the brightness difference adjustment circuit 130 can generate the adjusted brightness difference (0, 0, 4, 4, 4, 4, 0, 0).

Then, the output circuit 140 generates adjusted pixel values "0", "0", "0", "4", "8", "12", "16", "16", and "16" at positions 0-8 according to the adjusted brightness differences.

Figure 2:
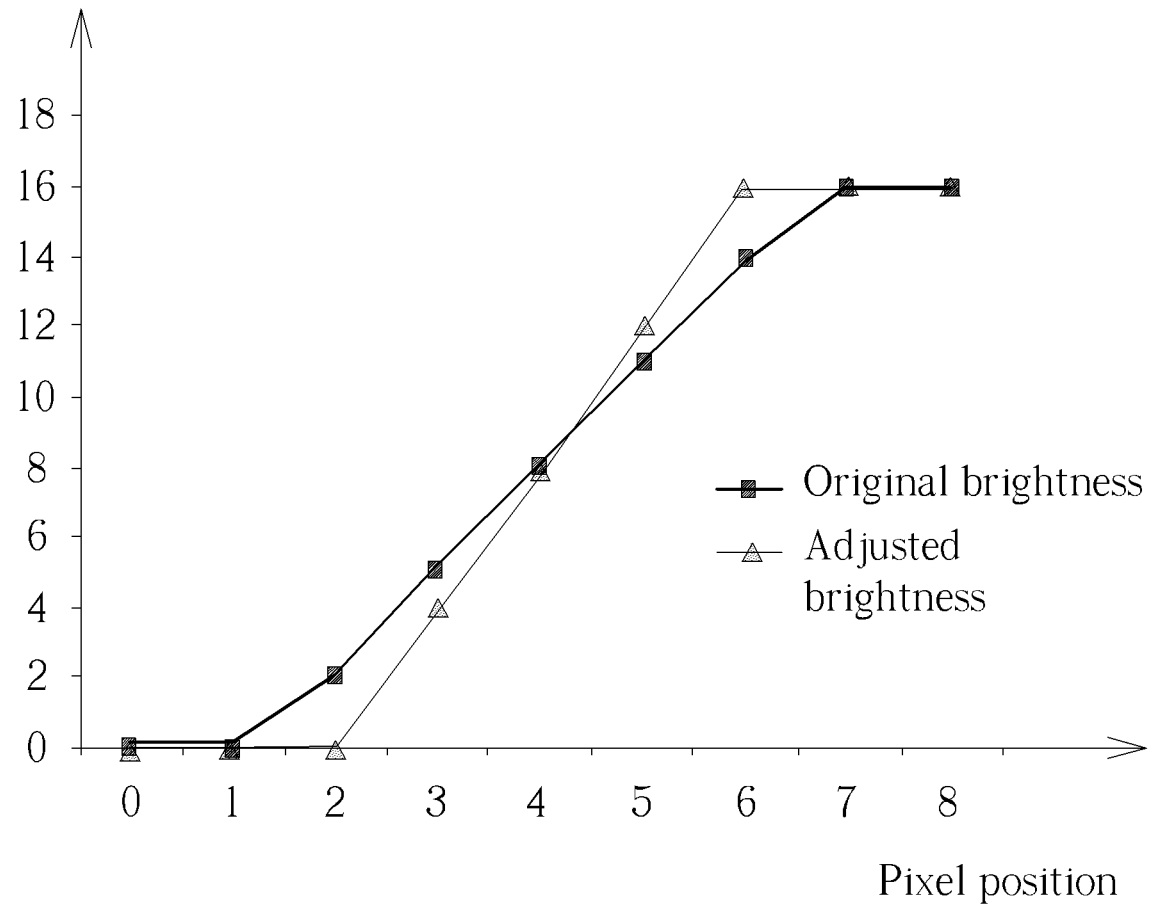
FIG. 2 is a diagram showing original brightness of the image data and adjusted brightness of an output image.

FIG. 2 is a diagram showing original brightness of the image data Din and adjusted brightness of an output image Dout. As shown in FIG. 2, the transition of adjusted brightness (i.e., positions 2-6) is smaller than the transition of original brightness (i.e., positions 1-7), that is, the adjusted brightness has sharper edges, so that when the back-end circuit 102 performs other operations, such as image enlargement operations, it can maintain a sharper edge without blurring the edges.

The above embodiments are described with pixels with continuous increasing brightness, and a person skilled in the art should understand how to achieve examples of pixels with continuous decreasing brightness after reading the above embodiments, so the relevant details are omitted here.

The above embodiments describe the brightness adjustments of multiple pixels with a single direction, such as the horizontal brightness adjustments of the image data Din, and then the characteristic value calculation circuit 120 and the brightness difference adjustment circuit 130 can perform another direction (for example, the brightness adjustments of multiple pixels of the image data Din in the vertical direction) to complete the brightness adjustments of the entire image data Din to generate the output image Dout. Since the pixels at the edge of the image generally have strict increasing/decreasing pixel values, the operations of the above embodiment can surely and effectively reduce the edge blur caused by the image processing operations. In addition, because the calculation steps are relatively simple, only simple software operations or hardware calculation circuits are required to reduce the design and manufacturing costs.

In the embodiment of FIG. 1, the image processing circuit 100 is mainly used to process the image data Din with three consecutive pixels with increasing/decreasing brightness. If the image data Din is at the positions 0-8 is not an increasing/decreasing sequence or a strictly increasing/decreasing sequence, the image data can be processed by other circuits, or the original brightness can be divided into two sets of brightness values, one of which contains strict increasing/decreasing brightness for processing by the image processing circuit 100.

It should be noted that the enlargement operations of the pixel values in the above embodiment may include a plurality of pixel values of different colors according to different color models. Taking the "red, green and blue" color model as an example, the operations of the plurality of pixels includes the operations of red pixel values, green pixel values, and blue pixel values. Taking the "luminance and color difference (YUV)" color model as an example, the operations of the plurality of pixels includes the operations of the brightness, blue chroma components, and red chroma components. Taking the "cyan, magenta, yellow, black (CMYK)" color model as an example, the operations of the plurality of pixels includes cyan pixel values, magenta pixel values, yellow pixel values and black pixel values.

Figure 3:
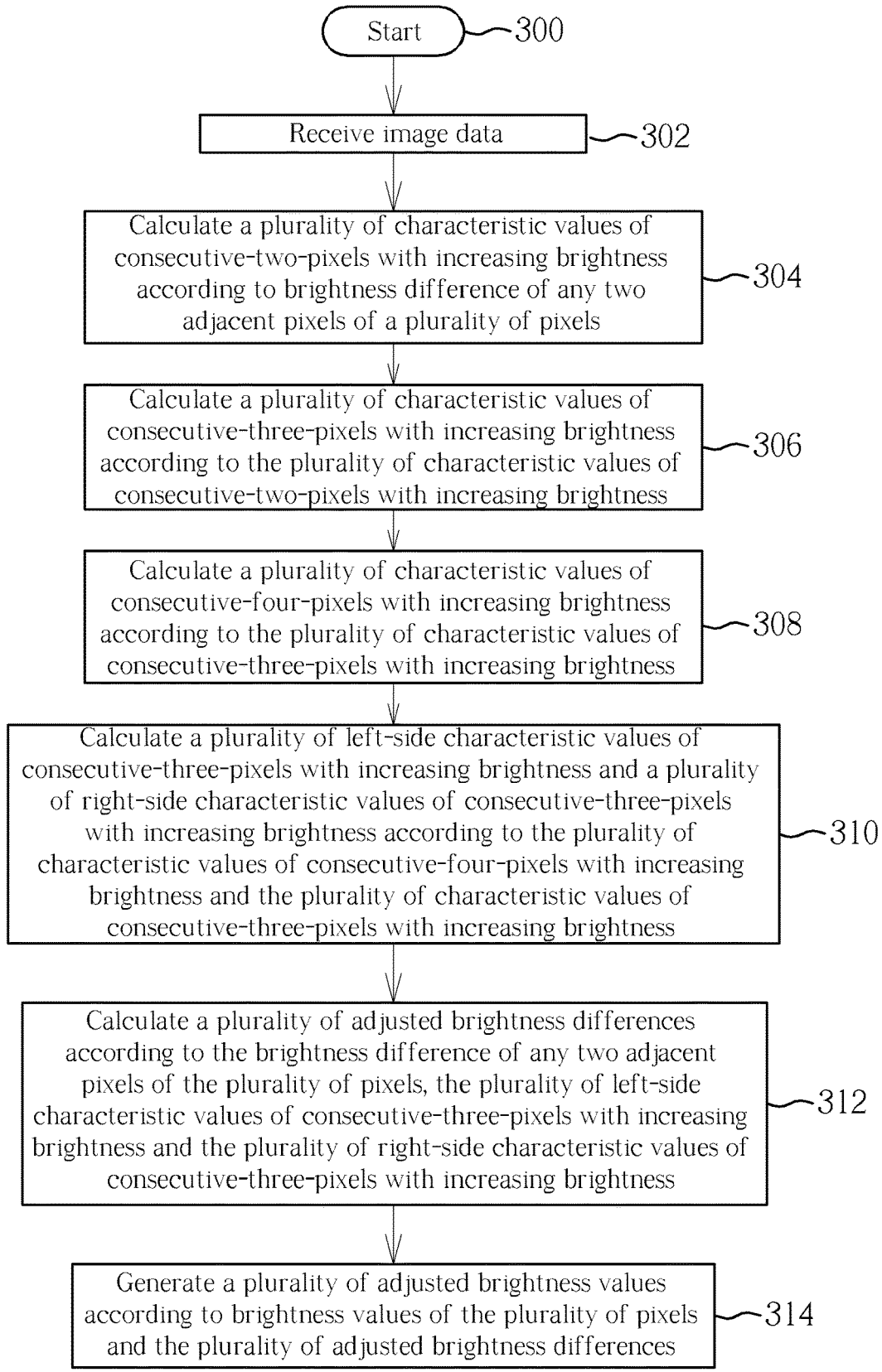
FIG. 3 is a flowchart of an image processing method according to one embodiment of the present invention.

FIG. 3 is a flowchart of an image processing method according to one embodiment of the present invention. Referring to the above embodiments to together, the flow of the image processing method is described as follows.

Step 300: the flow starts.

Step 302: receive image data.

Step 304: calculate a plurality of characteristic values of consecutive-two-pixels with increasing brightness according to brightness difference of any two adjacent pixels of a plurality of pixels.

Step 306: calculate a plurality of characteristic values of consecutive-three-pixels with increasing brightness according to the plurality of characteristic values of consecutive-two-pixels with increasing brightness.

Step 308: calculate a plurality of characteristic values of consecutive-four-pixels with increasing brightness according to the plurality of characteristic values of consecutive-three-pixels with increasing brightness.

Step 310: calculate a plurality of left-side characteristic values of consecutive-three-pixels with increasing brightness and a plurality of right-side characteristic values of consecutive-three-pixels with increasing brightness according to the plurality of characteristic values of consecutive-four-pixels with increasing brightness and the plurality of characteristic values of consecutive-three-pixels with increasing brightness.

Step 312: calculate a plurality of adjusted brightness differences according to the brightness difference of any two adjacent pixels of the plurality of pixels, the plurality of left-side characteristic values of consecutive-three-pixels with increasing brightness and the plurality of right-side characteristic values of consecutive-three-pixels with increasing brightness.

Step 314: generate a plurality of adjusted brightness values according to brightness values of the plurality of pixels and the plurality of adjusted brightness differences.

Figure 4:
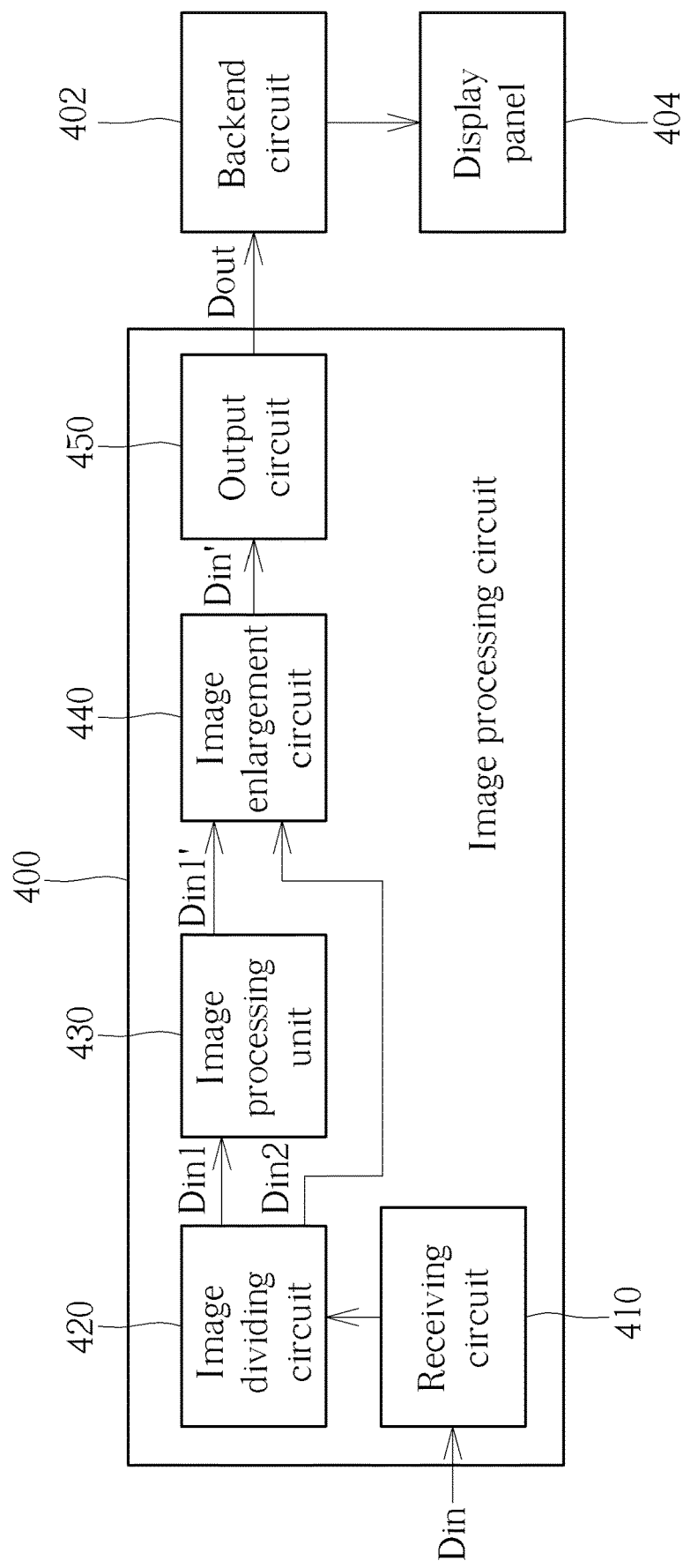
FIG. 4 is a diagram illustrating an image processing circuit according to another embodiment of the present invention.

FIG. 4 is a diagram illustrating an image processing circuit 400 according to another embodiment of the present invention. As shown in FIG. 4, the image processing circuit 400 comprises a receiving circuit 410, an image dividing circuit 420, an image processing unit 430, an image enlargement circuit 440 and an output circuit 450. In this embodiment, the image processing circuit 400 is configured to receive image data Din (e.g., image frame) and process the image data Din to generate an output image Dout, and the output image Dout is processed by a backend processing circuit 402 and then transmitted to a display panel 404 to be displayed thereon.

In the operation of the image processing circuit 400, the receiving circuit 410 receives the image data Din, and the image dividing circuit 420 divides a pixel value of each pixel into two parts to generate first image data Din1 and second image data Din2, wherein the first image data Din1 comprises consecutive-three-pixels with increasing brightness. Then, the image processing unit 430 processes the first image data Din to generate processed first image data Din', and the image enlargement circuit 440 combines the processed first image data Din' and the second image data Din2 to generate enlarged image data Din'. Finally, the output circuit 450 generates the output image Dout according to the enlarged image data Din'.

In the following descriptions, it is assumed that the image data Din comprises consecutive N pixels in the same column or the same row of a frame. For convenience of explanation, the following contents are described by using six consecutive pixels. Assuming that the pixels corresponding to positions 0, 1, 2 and 3, 4, 5 of the image data Din have the pixel values "0", "0", "5", "10", "12" and "12", respectively, wherein in the following description, a brightness value serves as the pixel value. In this embodiment, the image dividing circuit 420 divides the image data Din to the first image data Din1 and the second image data Din2, wherein the brightness values of the first image data Din1 are (0, 0, 2, 4, 6, 6), and the brightness values of the second image data Din2 are (0, 0, 3, 6, 6, 6). Then, the image processing unit 430 processes the first image data Din to generate the processed first image data Din'. In this embodiment, the image processing unit 430 is the image processing circuit 100 shown in FIG. 1, that is the first image data Din is processed by the characteristic value calculation circuit 120, brightness difference adjustment circuit 130 and the output circuit 140 to generate the processed first image data Din'. Since a person skilled in the field should understand how to use the calculation methods of the embodiments in FIGS. 1-3 to process the first image data Din1, the applicant directly lists the calculation results here, that is, The processed first image data Din' comprises the brightness values (0, 0, 0, 6, 6, 6). In the operation of the image enlargement circuit 440, the processed first image data Din1' and the second image data Din2 are combined to obtain the brightness values (0, 0, 3, 12, 12, 12), and then the image enlargement circuit 440 performs any suitable enlargement operation on these brightness values, such as the enlargement operation described in the Republic of China Patent Application No. 107138896, to obtain the enlarged image data Din'. Taking the enlargement factor "4" as an example, the applicant directly lists the calculation results, the enlarged image data Din' is (0, 0, 0, 0, 0, 0, 0, 0, 3, 6, 9, 9, 12, 12, 12, 12, 12, 12, 12, 12, 12, 12).

Briefly summarized, in the image processing circuit and associated image processing method of the present invention, by using the characteristic value calculation circuit to calculate the plurality of characteristic values of consecutive-three-pixels with increasing/decreasing brightness, the plurality of left-side characteristic values of consecutive-three-pixels with increasing/decreasing brightness and the plurality of right-side characteristic values of consecutive-three-pixels with increasing/decreasing brightness, the adjusted brightness values has sharper edges, so that when the backend circuit 102 performs other operations, the image data can maintain a sharper edge without blurring the edges.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing circuit, comprising:
 a receiving circuit, configured to receive image data;
 a characteristic value calculation circuit, coupled to the receiving circuit, wherein for a plurality of consecutive pixels in the image data, the characteristic value calculation circuit calculates a plurality of characteristic values of consecutive-three-pixels with increasing brightness according to a brightness difference of any two adjacent pixels of the plurality of pixels, and the characteristic value calculation circuit further calculates a plurality of left-side characteristic values of consecutive-three-pixels with increasing brightness and a plurality of right-side characteristic values of consecutive-three-pixels with increasing brightness according to the plurality of characteristic values of consecutive-three-pixels with increasing brightness;

a brightness difference adjustment circuit, coupled to the characteristic value calculation circuit, configured to calculate a plurality of adjusted brightness differences according to the brightness difference of any two adjacent pixels of the plurality of pixels, the plurality of left-side characteristic values of consecutive-three-pixels with increasing brightness and the plurality of right-side characteristic values of consecutive-three-pixels with increasing brightness; and an output circuit, coupled to the brightness difference adjustment circuit, configured to generate a plurality of adjusted brightness values according to brightness values of the plurality of pixels and the plurality of adjusted brightness differences.

2. The image processing circuit of claim 1, wherein the characteristic value calculation circuit calculates a plurality of characteristic values of consecutive-two-pixels with increasing brightness according to the brightness difference of any two adjacent pixels of the plurality of pixels, then calculates the plurality of characteristic values of consecutive-three-pixels with increasing brightness according to the plurality of characteristic values of consecutive-two-pixels with increasing brightness, then calculates a plurality of characteristic values of consecutive-four-pixels with increasing brightness according to the plurality of characteristic values of consecutive-three-pixels with increasing brightness; and the characteristic value calculation circuit calculates the plurality of left-side characteristic values of consecutive-three-pixels with increasing brightness and the plurality of right-side characteristic values of consecutive-three-pixels with increasing brightness according to the plurality of characteristic values of consecutive-three-pixels with increasing brightness and the plurality of characteristic values of consecutive-four-pixels with increasing brightness.

3. The image processing circuit of claim 2, wherein the characteristic value calculation circuit calculates the plurality of characteristic values of the consecutive-two-pixels with increasing brightness according to a same-sign component of two brightness differences between any pixel and two adjacent pixels, wherein the same-sign component of the two brightness differences is a median of three values comprising the two brightness differences and zero.

4. The image processing circuit of claim 2, wherein the characteristic value calculation circuit calculates the plurality of characteristic values of the consecutive-three-pixels with increasing brightness according to a same-sign component of two characteristic values of the consecutive-two-pixels with increasing brightness, wherein the same-sign component is a median of three values comprising the two characteristic values of the consecutive-three-pixels with increasing brightness and zero.

5. The image processing circuit of claim 2, wherein for each of the characteristic values of the consecutive-three-pixels with increasing brightness, the characteristic value calculation circuit subtracts a left-side characteristic value of the consecutive-four-pixels with increasing brightness from the characteristic values of the consecutive-three-pixels with increasing brightness to obtain the corresponding left-side characteristic value of the consecutive-three-pixels with increasing brightness; and for each of the characteristic values of the consecutive-three-pixels with increasing brightness, the characteristic value calculation circuit subtracts a right-side characteristic value of the consecutive-four-pixels with increasing brightness from the characteristic values of the consecutive-three-pixels with increasing brightness to obtain the corresponding right-side characteristic value of the consecutive-three-pixels with increasing brightness.

6. The image processing circuit of claim 1, wherein the brightness difference adjustment circuit moves the brightness difference of any two adjacent pixels of the plurality of pixels to a center of the plurality of pixels to calculate the plurality of adjusted brightness differences according to the brightness difference between any two adjacent pixels, the plurality of left-side characteristic value of the consecutive-three-pixels with increasing brightness and the plurality of right-side characteristic value of the consecutive-three-pixels with increasing brightness.

7. An image processing method, comprising:

receiving image data;

for a plurality of consecutive pixels in the image data, calculating a plurality of characteristic values of consecutive-three-pixels with increasing brightness according to a brightness difference of any two adjacent pixels of the plurality of pixels, and calculating a plurality of left-side characteristic values of consecutive-three-pixels with increasing brightness and a plurality of right-side characteristic values of consecutive-three-pixels with increasing brightness according to the plurality of characteristic values of consecutive-three-pixels with increasing brightness;

calculating a plurality of adjusted brightness differences according to the brightness difference of any two adjacent pixels of the plurality of pixels, the plurality of left-side characteristic values of consecutive-three-pixels with increasing brightness and the plurality of right-side characteristic values of consecutive-three-pixels with increasing brightness; and generating a plurality of adjusted brightness values according to brightness values of the plurality of pixels and the plurality of adjusted brightness differences.

8. The image processing method of claim 7, wherein the step of calculating the plurality of characteristic values of consecutive-three-pixels with increasing brightness according to the brightness difference of any two adjacent pixels of the plurality of pixels, and calculating the plurality of left-side characteristic values of consecutive-three-pixels with increasing brightness and the plurality of right-side characteristic values of consecutive-three-pixels with increasing brightness according to the plurality of characteristic values of consecutive-three-pixels with increasing brightness comprises:

calculating a plurality of characteristic values of consecutive-two-pixels with increasing brightness according to the brightness difference of any two adjacent pixels of the plurality of pixels;

calculating the plurality of characteristic values of consecutive-three-pixels with increasing brightness according to the plurality of characteristic values of consecutive-two-pixels with increasing brightness;

calculating a plurality of characteristic values of consecutive-four-pixels with increasing brightness according to the plurality of characteristic values of consecutive-three-pixels with increasing brightness;

calculating the plurality of left-side characteristic values of consecutive-three-pixels with increasing brightness and the plurality of right-side characteristic values of consecutive-three-pixels with increasing brightness according to the plurality of characteristic values of consecutive-three-pixels with increasing brightness and the plurality of characteristic values of consecutive-four-pixels with increasing brightness.

9. The image processing method of claim 8, wherein the step of calculating the plurality of characteristic values of consecutive-two-pixels with increasing brightness according to the brightness difference of any two adjacent pixels of the plurality of pixels comprises:

calculating the plurality of characteristic values of the consecutive-two-pixels with increasing brightness according to a same-sign component of two brightness differences between any pixel and two adjacent pixels, wherein the same-sign component of the two brightness differences is a median of three values comprising the two brightness differences and zero.

10. The image processing method of claim 8, wherein the step of calculating the plurality of characteristic values of consecutive-three-pixels with increasing brightness according to the plurality of characteristic values of consecutive-two-pixels with increasing brightness comprises:

calculating the plurality of characteristic values of the consecutive-three-pixels with increasing brightness according to a same-sign component of two characteristic values of the consecutive-two-pixels with increasing brightness, wherein the same-sign component is a median of three values comprising the two characteristic values of the consecutive-three-pixels with increasing brightness and zero.

11. The image processing method of claim 8, wherein the step of calculating the plurality of left-side characteristic values of consecutive-three-pixels with increasing brightness and the plurality of right-side characteristic values of consecutive-three-pixels with increasing brightness according to the plurality of characteristic values of consecutive-three-pixels with increasing brightness and the plurality of characteristic values of consecutive-four-pixels with increasing brightness comprises:

for each of the characteristic values of the consecutive-three-pixels with increasing brightness, subtracting a left-side characteristic value of the consecutive-four-pixels with increasing brightness from the characteristic values of the consecutive-three-pixels with increasing brightness to obtain the corresponding left-side characteristic value of the consecutive-three-pixels with increasing brightness; and for each of the characteristic values of the consecutive-three-pixels with increasing brightness, subtracting a right-side characteristic value of the consecutive-four-pixels with increasing brightness from the characteristic values of the consecutive-three-pixels with increasing brightness to obtain the corresponding right-side characteristic value of the consecutive-three-pixels with increasing brightness.

12. The image processing method of claim 7, wherein the step of calculating the plurality of adjusted brightness differences according to the brightness difference of any two adjacent pixels of the plurality of pixels, the plurality of left-side characteristic values of consecutive-three-pixels with increasing brightness and the plurality of right-side characteristic values of consecutive-three-pixels with increasing brightness comprises:

moving the brightness difference of any two adjacent pixels of the plurality of pixels to a center of the plurality of pixels to calculate the plurality of adjusted brightness differences according to the brightness difference between any two adjacent pixels, the plurality of left-side characteristic value of the consecutive-three-pixels with increasing brightness and the plurality of right-side characteristic value of the consecutive-three-pixels with increasing brightness.

* * * * *